A. J. HOWELL.
Grain Winnower.
No. 6,848. Patented Nov. 6, 1849.
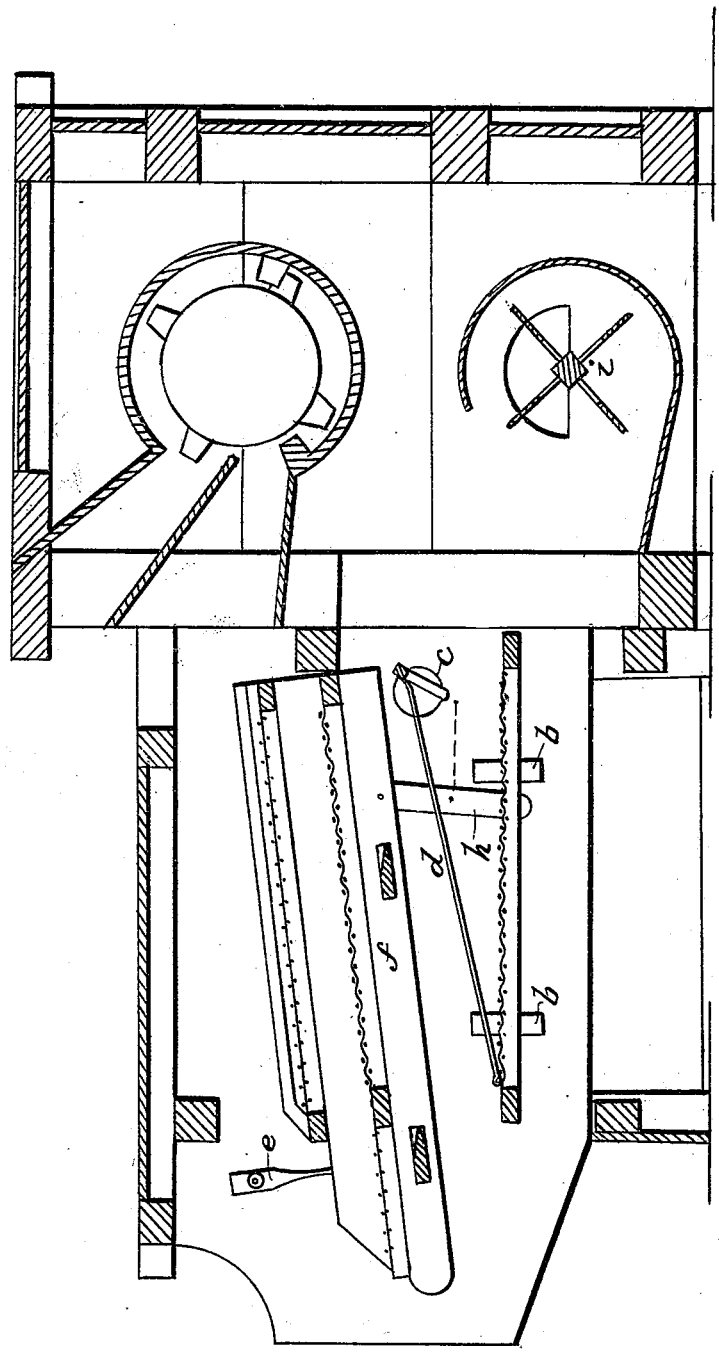

UNITED STATES PATENT OFFICE.

A. J. HOWELL, OF SPRUCE HILL, PENNSYLVANIA.

WINNOWING-MACHINE.

Specification of Letters Patent No. 6,848, dated November 6, 1849.

*To all whom it may concern:*

Be it known that I, A. J. HOWELL, of Spruce Hill, in the county of Juniata and State of Pennsylvania, have invented certain new and useful Improvements in Clover-Machines and Other Seed-Cleaners, and that the following is a full, clear, and exact description of the principle or character which distinguishes them from all other things before known and of the usual manner of making, modifying, and using the same, reference being had to the accompanying drawing, which is a vertical longitudinal section of the machine.

The nature of my invention consists in the peculiar mode of suspending and working the fans, by which I effect a more perfect separation of the seed from the chaff, with the same amount of labor, than by any other mode with which I am acquainted.

The lower sieve ($a$,) is made to slide forward and back, horizontally, or at any desired angle in grooves formed in the cleats ($b$,) attached to the sides of the frame (which frame is made like that of any ordinary fans) motion is given to the sieve ($a$,) by means of a crank ($c$,) connected with it, by a connecting rod ($d$,) extending from the crank over the rear end of the sieve to the forward end thereof, where it is jointed; and as the crank revolves, slides the sieve ($a$,) back and forth, as above stated; above this sliding sieve there is what is usually denominated a shaking shoe ($f$,) with two screens or sieves, more or less, in it, arranged to suit the work to be performed; the front end of this shoe is suspended on two spring rods ($e$,) one on each side, one of which only is shown in the sectional drawing; the other end of this shoe is supported on the upper ends of two bars or props ($h$,) the lower ends of which are jointed to the sliding sieve; by this connection it will be perceived, that as the sieve slides in either direction, the shoe will be shaken up and down; if there is an additional rod connecting the bar ($h$,) with the frame, as shown by the dotted lines, a forward and back motion will also be given to the shoe. The compound motions, as above described, completes the operation of cleaning, with the aid of a common fan ($i$,) in a most complete manner.

Having thus fully described my improved seed cleaner, what I claim therein as new, and for which I desire to secure Letters Patent, is—

The combination and arrangement of the horizontally sliding screen and shaking shoe, operated in the manner and for the purposes set forth.

A. J. HOWELL.

Witnesses:
HENRY W. LOUDER,
J. D. HOWELL.